United States Patent
Schiavoni et al.

(10) Patent No.: US 10,831,092 B2
(45) Date of Patent: Nov. 10, 2020

(54) LAYERED ELEMENT MADE OF TRANSPARENT LAYERS PROVIDING DIRECTIONAL DIFFUSE REFLECTION

(71) Applicant: SAINT-GOBAIN GLASS FRANCE, Courbevoie (FR)

(72) Inventors: Michele Schiavoni, Paris (FR); Cécile Ozanam, Palaiseau (FR); Patrick Gayout, Villemomble (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 16/482,320

(22) PCT Filed: Jan. 29, 2018

(86) PCT No.: PCT/FR2018/050192
§ 371 (c)(1),
(2) Date: Jul. 31, 2019

(87) PCT Pub. No.: WO2018/142050
PCT Pub. Date: Aug. 9, 2018

(65) Prior Publication Data
US 2020/0012180 A1   Jan. 9, 2020

(30) Foreign Application Priority Data

Jan. 31, 2017 (FR) ...................... 17 50796

(51) Int. Cl.
*G03B 21/62* (2014.01)
*G02B 1/11* (2015.01)
(Continued)

(52) U.S. Cl.
CPC .............. *G03B 21/62* (2013.01); *G02B 1/11* (2013.01); *G02B 5/0221* (2013.01); *G02B 5/045* (2013.01);
(Continued)

(58) Field of Classification Search
CPC .... G03B 21/625; G03B 21/60; G03B 21/602; G03B 21/56; G02B 5/045
(Continued)

(56) References Cited

U.S. PATENT DOCUMENTS 3,661,686 A * 5/1972 Armstrong .............. B32B 15/08
428/164
4,264,664 A * 4/1981 Kunz ........................ E06B 9/24
160/238

(Continued)

FOREIGN PATENT DOCUMENTS

WO    WO 2013/175129 A1    11/2013

OTHER PUBLICATIONS

Kelley, Edward F. et al, 'Display reflectance model based on the BRDF', Elsevier, Feb. 19, 1998, 8 pages (Year: 1998).*

(Continued)

*Primary Examiner* — Clayton E. LaBalle
*Assistant Examiner* — Kevin C Butler
(74) *Attorney, Agent, or Firm* — Pillsbury Winthrop Shaw Pittman LLP

(57) ABSTRACT

A transparent layered element includes two transparent external layers having substantially the same refractive index and each having a smooth external main surface, and a central layer intermediate between the external layers, the central layer including at least one transparent layer of refractive index different from that of the external layers or a metal layer. All the contact surfaces between two adjacent layers of the layered element, one of the two layers of which is a metal layer, or that are two transparent layers of different refractive indices, being textured and parallel to one another, the diffuse light reflection of the layered element on the side of at least one of the external layers having at least one maximum in a direction different from the direction of (Continued)

specular reflection. In addition, the surface of the layered element is divided into a plurality of pixels of same size.

19 Claims, 9 Drawing Sheets

(51) Int. Cl.
    *G02B 5/02*         (2006.01)
    *G03B 21/625*     (2014.01)
    *G03B 21/602*     (2014.01)
    *G03B 21/60*      (2014.01)
    *G03B 21/56*      (2006.01)
    *G02B 5/04*         (2006.01)

(52) U.S. Cl.
    CPC ............. *G03B 21/56* (2013.01); *G03B 21/60* (2013.01); *G03B 21/602* (2013.01); *G03B 21/625* (2013.01); *G02B 2207/109* (2013.01)

(58) Field of Classification Search
    USPC ......................................................... 359/454
    See application file for complete search history.

(56) References Cited

U.S. PATENT DOCUMENTS

| | | | | |
|---|---|---|---|---|
| 6,281,867 | B2* | 8/2001 | Kurematsu | ................... 345/589 |
| 2003/0161997 | A1* | 8/2003 | Moran | ...................... B32B 3/30 |
| | | | | 428/172 |
| 2004/0136038 | A1* | 7/2004 | Holmes | ................ G02B 5/0268 |
| | | | | 359/15 |
| 2009/0316262 | A1* | 12/2009 | Kittaka | ................ G02B 5/3041 |
| | | | | 359/485.01 |
| 2011/0310487 | A1* | 12/2011 | Nagahama | ................ E06B 9/24 |
| | | | | 359/599 |
| 2014/0104690 | A1* | 4/2014 | Sandre-Chardonnal | ..................... |
| | | | | B32B 17/10 |
| | | | | 359/599 |
| 2015/0138627 | A1* | 5/2015 | Ehrensperger | ......... G03B 21/60 |
| | | | | 359/315 |
| 2015/0192707 | A1* | 7/2015 | Ehrensperger | .... B32B 17/10018 |
| | | | | 359/599 |
| 2016/0282522 | A1* | 9/2016 | Schiavoni | ......... B32B 17/10036 |
| 2020/0012180 | A1* | 1/2020 | Schiavoni | ............... B32B 27/40 |

OTHER PUBLICATIONS

DA-LITE, Angles of Reflection , DA-LITE Milestone AA Technologies LLC, 2007, 84 pages (Year: 2014).*

Rafael Martínez-Planell et al., Student Understanding of Directional Derivatives of Functions of Two Variables, Proceedings of the 37th annual meeting of the North American Chapter of the International Group for the Psychology of Mathematics Education, 2015, pp. 355-362 (Year: 2015).*

International Search Report as issued in International Patent Application No. PCT/FR2018/050192, dated May 30, 2018.

* cited by examiner

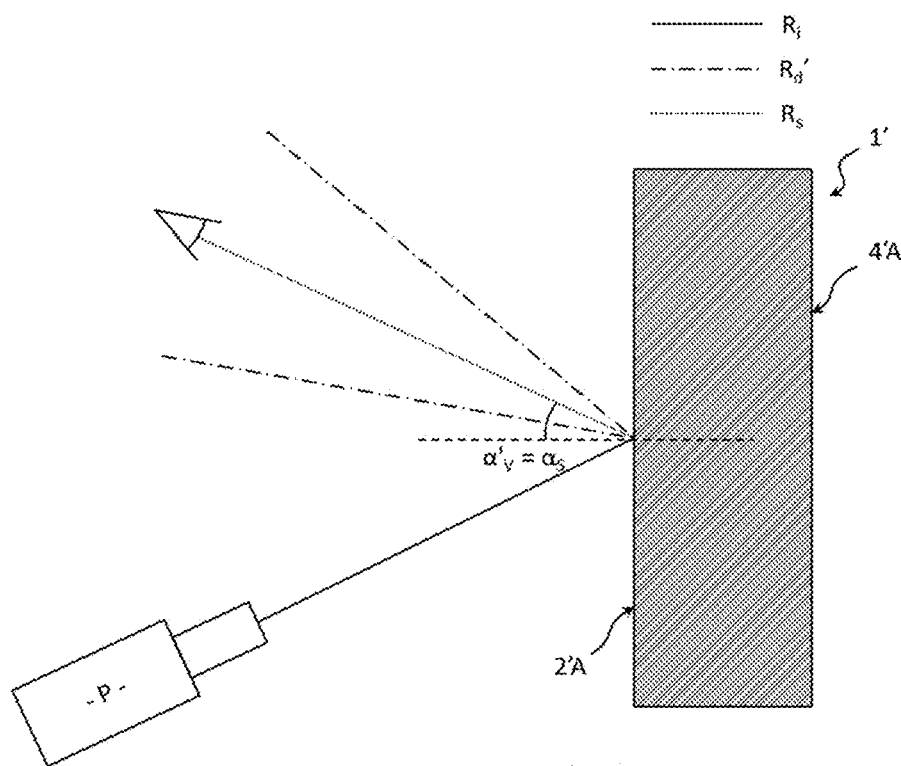
Fig. 1 – Prior art
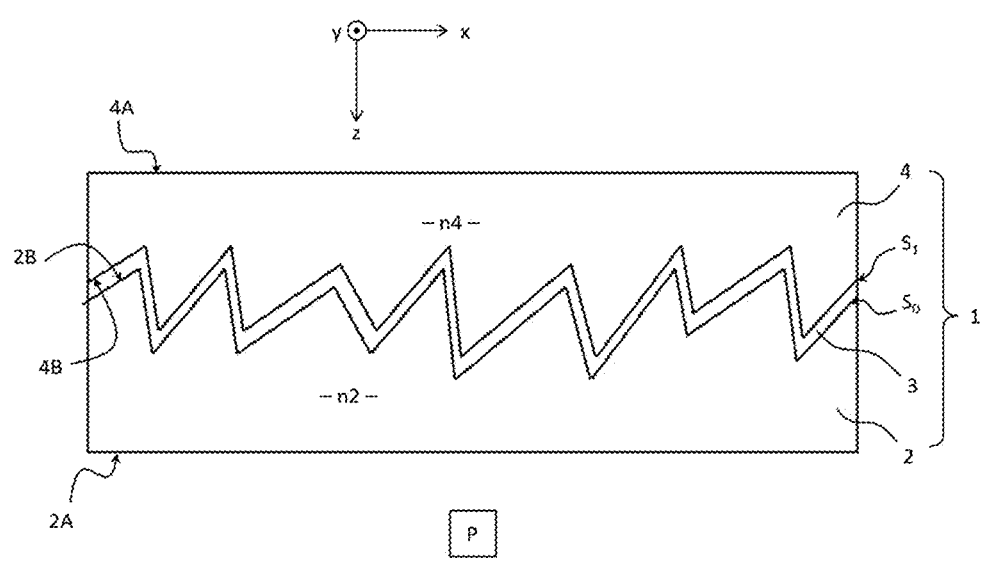
Fig. 2

LAYERED ELEMENT MADE OF TRANSPARENT LAYERS PROVIDING DIRECTIONAL DIFFUSE REFLECTION

CROSS-REFERENCE TO RELATED APPLICATIONS

This application is the U.S. National Stage of PCT/FR2018/050192, filed Jan. 29, 2018, which in turn claims priority to French patent application number 1750796 filed Jan. 31, 2017. The content of these applications are incorporated herein by reference in their entireties.

TECHNICAL FIELD OF THE INVENTION

The technical field of the invention is that of transparent glazings comprising a transparent layered element having diffuse reflection properties. Such transparent glazings may serve as projection screens and may in particular be used in the architectural field or in the transportation field, for example in glazings for airplanes, trains, or motor vehicles (automobiles, trucks, etc.), and in particular in windshields, side windows or glazed roofs.

TECHNOLOGICAL BACKGROUND OF THE INVENTION

Known glazings comprise standard transparent glazings, which give rise to specular transmission and to specular reflection of radiation incident on the glazing, and translucent glazings, which give rise to diffuse transmission and to diffuse reflection of radiation incident on the glazing.

Usually, reflection by a glazing is said to be diffuse when radiation incident on the glazing with a given angle of incidence is reflected by the glazing in a plurality of directions. Reflection by a glazing is said to be specular when radiation incident on the glazing with a given angle of incidence is reflected by the glazing with an angle of reflection equal to the angle of incidence. Analogously, the transmission through a glazing is said to be specular when radiation incident on the glazing with a given angle of incidence is transmitted by the glazing with an angle of transmission equal to the angle of incidence.

A front projection screen comprises two main surfaces or faces, namely a first face that is positioned in the same region of space as the light source and onto which the image coming from the light source is projected (direct projection) and an opposite second face on which the image projected onto the first face potentially appears by transparency.

A rear projection screen has a first face and an opposite second face possessing the same characteristics as those of the aforementioned front projection screens. In contrast, a rear projection screen differs from a front projection screen in the fact that the user and the light source are not located in the same region of space but are located on either side of the screen. Rear projection implies placing the projector behind the glazing.

Below, unless otherwise indicated, the term "projection" is used in a general way to designate both front projection and rear projection.

It is not envisionable to use standard transparent glazings as projection screens. Specifically, these glazings do not have diffuse reflection properties, they therefore do not allow images to be formed on any one of their faces and generate clear reflections in the manner of mirrors.

Many attempts have been made to give standard transparent glazings additional properties allowing them to be used as projection screens, while maintaining clear vision through the glazing.

WO 2013/175129 A1 describes a glazing comprising a transparent layered element having diffuse reflection properties allowing images to be projected, with a large viewing angle, while maintaining the transparency of the glazing. Radiation incident on the layered element is reflected diffusely and transmitted specularly by the layered element.

For given radiation incident on the layered element according to document WO 2013/175129 A1, the further the angle of observation of an observer gets from the angle of specular reflection, the more the brightness of a projected image decreases for the observer. The best angle of observation for an observer is therefore the angle that corresponds to specular reflection. However, any radiation incident on a smooth external surface of the layered element is not entirely transmitted and therefore also gives rise to a specular reflection that may dazzle the observer. This effect is schematically shown in FIG. 1: a projector P emits incident radiation in a direction $R_i$. A first portion of the incident radiation is transmitted by a smooth external surface 2'A of the layered element 1', then is diffusely reflected, in a plurality of directions $R_d'$, by a central layer of the layered element (not shown in FIG. 1). A second portion of the incident radiation is reflected by the smooth external surface 2'A specularly, in the manner of a mirror, in a direction $R_s$. The plurality of directions $R_d'$ is centered on the direction $R_s$ of specular reflection: the angle of observation $\alpha_v'$ of an observer ideally positioned to observe a projected image is equal to the angle $\alpha_s$ of specular reflection, and the observer thus positioned is therefore liable to be discomforted by an undesirable reflection.

One way of minimizing this effect is to make the brightness vary as little as possible with angle, this amounting to obtaining the largest possible angular aperture for the diffuse reflection. However, increasing the angular aperture of the diffuse reflection, for a given projector brightness, amounts to distributing a given amount of light over a large angle, and therefore to decreasing the brightness at each point of the glazing used as screen. Alternatively, or in addition, the deposition of an antireflection layer is possible but does not allow specular reflection to be completely prevented.

It is in particular these drawbacks that the present invention intends to remedy, by providing a transparent layered element and a transparent glazing allowing images to be projected with a good resolution, a high brightness and a limited risk of dazzling an observer, while not preventing a clear vision through the glazing.

SUMMARY OF THE INVENTION

To this end, one subject of the invention is a transparent layered element comprising:
  two transparent external layers having substantially the same refractive index and each having a smooth external main surface, and
  a central layer intermediate between the external layers, the central layer including at least one transparent layer of refractive index different from that of the external layers or a metal layer,
  all the contact surfaces between two adjacent layers of the layered element, one of the two layers of which is a metal layer, or that are two transparent layers of different refractive indices, being textured and parallel to one another, characterized in that the diffuse light reflection of the layered element on the side of at least one of the external layers has at least one maximum in a direction different from the direction of specular reflection, and in that the surface of the layered element is divided into a plurality of pixels of same size, each pixel having at least one side of length smaller than or equal to 500 µm, and preferably smaller than or equal to 200 µm, the texture of each textured contact surface within each pixel having a slope distribution $f_{pix}(\theta_x, \theta_y)$ having a correlation coefficient r with the slope distribution $f_{tot}(\theta_x, \theta_y)$ of the texture of the total textured contact surface, the layered element being such that, for a sample of N pixels, the average of the correlation coefficients r ($f_{pix}$, $f_{tot}$) of each pixel of the sample is higher than or equal to 0.8.

According to the invention, the angular variation in the diffuse light reflection RLdiff of the layered element on the side of an external layer is advantageously determined by measuring the BRDF (Bidirectional Reflectance Distribution Function) of the layered element on the side of said external layer. As is known, the BRDF is the ratio between the radiance in reflection of the layered element on the side of said external layer in the direction ($\theta'$, $\varphi'$) and the irradiance thereof when the latter originates from a collimated light source, as a function of the direction of incidence ($\theta$, $\varphi$):

$$BRDF(\lambda, \theta, \varphi, \theta', \varphi') = \frac{L(\lambda, \theta', \varphi')}{E(\lambda, \theta, \varphi)},$$

which may also be expressed by:

$$BRDF(\lambda, \theta, \varphi, \theta', \varphi') = \frac{L(\lambda, \theta', \varphi')}{\pi * \text{Ldiffuser\_perfect}(\lambda)}.$$

In the context of the invention, the BRDF is measured using a goniophotometer such as a REFLET-90 or REFLET-180 system from STIL.

By virtue of the invention, the diffuse reflection of the layered element is defined by a plurality of reflection directions that is centered on at least one preferential direction different from the direction of specular reflection. Thus, the or each best angle of observation for the observer, i.e. the angle of observation that allows the observer to observe a projected image with a maximum brightness, is disassociated with the direction of specular reflection. The risk of specular reflection causing dazzle is therefore decreased or even avoided. This directional diffuse reflection, combined with the transparency in transmission of the transparent layered element, allows projected images of good brightness to be obtained. Advantageously, in situations in which the viewing angle is small, it is possible to concentrate the radiation diffusely reflected by the layered element in privileged directions, by selecting a suitable texture for each textured contact surface of the layered element, according to the invention.

In addition, the fact that the texture of each textured contact surface within each pixel has a slope distribution having a high correlation coefficient with the slope distribution of the texture of the total textured contact surface guarantees that each pixel is sufficiently representative of the texture of the total contact surface, i.e. of the slope distribution of the texture of each textured contact surface of the layered element, to ensure a satisfactory resolution when the layered element or a glazing incorporating it is used as a projection screen.

It will be noted that the need for a sufficient resolution is particularly great in the case of a layered element according to the invention, which provides directional diffuse reflection, as if the resolution is not sufficient the surface of the layered element or of a glazing incorporating it will not uniformly redirect the radiation in the one or more privileged directions corresponding to the privileged angles of observation.

According to one aspect of the invention, the layered element is intended to be used, by an observer, lying substantially parallel to a plane Oxy of a coordinate system (O, x, y, z) in which the axis Ox is in a horizontal direction and the axis Oy is in a vertical direction with respect to the observer, the texture of each of said textured contact surfaces between two adjacent layers of the layered element, one of the two layers of which is a metal layer, or that are two transparent layers of different refractive indices, being of equation z=f(x, y) and having, at each point of coordinates ($X_0$, $Y_0$) of the contact surface, a first directional slope $\theta_x$ and a second directional slope $\theta_y$ such that:

$$\theta_x(X_0, Y_0) = \arctan\frac{dz}{dx}\bigg|_{X_0, Y_0} \text{ and}$$

$$\theta_y(X_0, Y_0) = \arctan\frac{dz}{dy}\bigg|_{X_0, Y_0},$$

and the slope distribution of the texture of each of said textured contact surfaces, which corresponds to the frequency of each pair of slopes ($\theta_x$, $\theta_y$), not having axial symmetry about at least one of the axes ($O\theta_x$, $O\theta_y$) of a first orthogonal coordinate system (O, $\theta_x$, $\theta_y$) where O corresponds to the pair of slopes (0, 0), or not having axial symmetry about at least one of the axes ($O\theta_x'$, $O\theta_y'$) of a second orthogonal coordinate system (O, $\theta_x'$, $\theta_y'$) obtained by rotating by 45° the first orthogonal coordinate system (O, $\theta_x$, $\theta_y$).

In the context of the invention, the following are differentiated between:
on the one hand, metal layers, the value of the refractive index of which is unimportant, and
on the other hand, transparent layers, dielectric layers in particular, the difference in the refractive index of which with respect to that of the external layers is to be taken into account.

By "dielectric material" or "dielectric layer", what is meant is a material or layer of low electrical conductivity, i.e. of electrical conductivity lower than 100 S/m.

Each external layer of the layered element may be formed by a stack of layers, provided that the various constituent layers of the external layer are made of transparent, in particular dielectric, materials all having substantially the same refractive index.

The central layer of the layered element may be formed by a single layer that is a transparent, in particular dielectric, layer of refractive index different from that of the external layers or a metal layer. As a variant, the central layer of the layered element may be formed by a stack of layers that comprises at least one transparent, in particular dielectric, layer of refractive index different from that of the external layers or a metal layer.

Advantageously, to obtain the diffuse-reflection and specular-transmission properties of the layered element, all the contact surfaces between two adjacent layers of the layered element, one of which is a transparent, in particular dielectric, layer and the other of which is a metal layer, or that are two transparent, in particular dielectric, layers of different refractive indices, are textured and parallel to one another.

The diffuse reflection on each side of the layered element is due to the fact that each contact surface between two adjacent layers of the layered element, one of which is a transparent, in particular dielectric, layer and the other of which is a metal layer, or that are two transparent, in particular dielectric, layers of different refractive indices, is textured. Thus, when radiation incident on the layered element, on either side thereof, reaches such a contact surface, it is reflected by the metal layer or because of the difference in refractive index between the two transparent layers and, as the contact surface is textured, the reflection is diffuse.

The specular transmission through the layered element is for its part due to the fact that the two external layers have smooth external main surfaces and are made of materials having substantially the same refractive index, and to the fact that all the contact surfaces between two adjacent layers of the layered element, one of which is a transparent, in particular dielectric, layer and the other of which is a metal layer, or that are two transparent, in particular dielectric, layers of different refractive indices, are textured and parallel to one another.

In the context of the invention, two transparent, in particular dielectric, materials have substantially the same refractive index, or have refractive indices that are substantially equal, when the absolute value of the difference between their refractive indices at 550 nm is smaller than or equal to 0.15. Preferably, the absolute value of the difference between the refractive indices at 550 nm of the materials from which the two external layers of the layered element are made is smaller than 0.05, and more preferably smaller than 0.015. In the context of the invention, two transparent, in particular dielectric, layers have different refractive indices when the absolute value of the difference between their refractive indices at 550 nm is strictly larger than 0.15.

In the rest of this description, reference is made to the slopes of the texture of each textured contact surface of the layered element that is located between two adjacent layers, one of which is a transparent, in particular dielectric, layer and the other of which is a metal layer, or between two adjacent layers that are two transparent, in particular dielectric, layers of different refractive indices. Insofar as all the textured contact surfaces of the layered element are parallel to one another, there is a single textured profile and a single slope distribution valid for all these textured contact surfaces.

In the context of the invention, the slope distribution of the texture of each textured contact surface is determined by carrying out the following steps:
  measuring the profile z=f(x, y) of the texture of one of said textured contact surfaces (the measurement of a single surface suffices, since it is representative of all the textured contact surfaces), for example the surface of the central layer, using a MICROMESURE 2 profilometer from STIL, in an area of 1 mm×1 mm, with a sampling interval of 1 µm×1 µm;
  calculating the first and second directional slopes $$\theta_x(X_0, Y_0) = \arctan\frac{dz}{dx}\bigg|_{X_0,Y_0} \text{ and}$$

$$\theta_y(X_0, Y_0) = \arctan\frac{dz}{dy}\bigg|_{X_0,Y_0}$$

for each point of the surface, where $$\frac{dz}{dx} \text{ and } \frac{dz}{dy}$$

are the partial altitude derivatives calculated with the Sobel filter.

For texture profile measurements carried out using a MICROMESURE 2 profilometer from STIL, the measurement conditions are the following. The measurement head consists of a chromatic lens associated with a "magnifier" having the following characteristics: numerical aperture of 0.42; maximum measurement angle of 25°; resolution in Z of 0.04 microns; lateral resolution of 4.5 microns. Texture profiles are extracted with a low-pass Gaussian filter having a cut-off length of 19 microns (which filters micro-roughness).

In this patent application, criteria are given for the slope distribution of the texture of each textured contact surface, it being understood that it is possible to establish corresponding criteria for the angular distribution of the diffuse reflection of the layered element. Specifically, there is a link between the local slope and the direction of reflection of the light, locally.

In particular, using the notations of FIG. 1 (without the apostrophes, i.e. the ""), a light ray at normal incidence with respect to the external main surface 2A of an external layer of the layered element is reflected from a facet of slope θ of the textured contact surface with an angle $\alpha_v$ given by the relationship: n2 sin(2θ)=sin $\alpha_v$, i.e. $\alpha_v$=arcsin(n2 sin(2θ)). Analogously, a light ray incident with an angle –$\alpha_s$ (opposite of the angle of specular reflection) on the external main surface 2A of an external layer of the layered element is reflected from a facet of slope θ of the textured contact surface with an angle $\alpha_v$ given by the relationship: n2 sin($\neq'_s$+2θ)=sin $\alpha_v$ and sin $\alpha_s$=n2 sin $\alpha'_s$, i.e.

$$\alpha_v = \arcsin\left(n2\sin\left[\arcsin\left(\frac{\sin\alpha_s}{n2}\right) + 2\theta\right]\right).$$

It will be noted that these equations are true provided that there is no total internal reflection at the interface between the external layer of the layered element and the air, i.e. provided that 2θ or $\alpha'_s$+2θ (depending on the circumstances) remains below arcsin(1/n2).

The textured surface that causes the diffuse reflection is not composed of one facet of single slope but of a plurality of facets with different slopes, so that each pair of slopes ($\theta_x$, $\theta_y$) is associated with a pair of angles of reflection ($\alpha_{vx}$, $\alpha_{vy}$) obtained by replacing θ with $\theta_x$ or $\theta_y$ in the above formulae. The proportion of light reflected in the direction ($\alpha_{vx}$, $\alpha_{vy}$) is then related to the proportion of slopes ($\theta_x$, $\theta_y$). The angular distribution of the diffuse reflection is therefore obtained by transforming the axes ($O\theta_x$, $O\theta_y$) into axes ($O\alpha_{vx}$, $O\alpha_{vy}$) using the appropriate formula. For example, in the case of a projector located facing the layered element and n2=1.51, the graduations 5, 10, 15° of the axes ($O\alpha_x$, $O\theta_y$) will become the graduations 15.2, 31.1 and 49° for the axes ($O\alpha_{vx}$, $O\alpha_{vy}$), this having the effect of dilating the distribution nonlinearly in both directions. However, even though the dilation is non-linear, the passage between the criteria for the slope distribution and the corresponding criteria for the angular distribution of the diffuse reflection is still valid because, on the one hand, the relationship between ($\theta_x$, $\theta_y$) and ($\alpha_{vx}$, $\alpha_{vy}$) may be linearized at small angles, and, on the other hand, the passage from ($\theta_x$, $\theta_y$) to ($\alpha_{vx}$, $\alpha_{vy}$) is an increasing function so that, even if a few ratios are slightly modified, the overall aspect of the distribution is not modified (same number of peaks in the distribution, with comparable relative positions). It will be noted that in the case where the projector is not located facing the layered element (nonzero incidence), the peak at O is shifted in the direction of the specular reflection.

In the context of the invention, the following definitions are used:

A transparent element is an element through which radiation is transmitted at least in the wavelength domains useful for the targeted application of the element. By way of example, when the element is used as an architectural or vehicular glazing, it is transparent at least in the visible wavelength domain.

A transparent glazing is an organic or mineral, rigid transparent substrate.

A smooth surface is a surface for which surface irregularities are of size smaller than the wavelength of the radiation incident on the surface, so that the radiation is not deviated by these surface irregularities. The incident radiation is then specularly reflected and transmitted by the surface.

A textured surface is a surface for which the surface properties vary on a scale larger than the wavelength of the radiation incident on the surface. The incident radiation is then diffusely reflected and transmitted by the surface.

The transparent layered element allows a specular transmission and a diffuse reflection of radiation incident on the layered element from the side of either one of its external layers to be obtained. The central layer of the transparent layered element promotes diffuse reflection, this allowing the direct projection of an image onto either one of the sides of the transparent layered element, and of a transparent glazing incorporating it, the image being formed on the central layer.

According to one aspect of the invention, the slope distribution of the texture of each textured contact surface of the layered element, which corresponds to the frequency of each pair of slopes ($\theta_x$, $\theta_y$), does not have axial symmetry about at least one of the axes of an orthogonal coordinate system centered on O.

In one embodiment, the slope distribution of the texture of each textured contact surface of the layered element, which corresponds to the frequency of each pair of slopes ($\theta_x$, $\theta_y$), has, excluding a potential peak centered on O, a single peak not centered on O.

In another embodiment, the slope distribution of the texture of each textured contact surface of the layered element, which corresponds to the frequency of each pair of slopes ($\theta_x$, $\theta_y$), has, excluding a potential peak centered on O, at least two peaks not centered on O.

According to one particular embodiment, all the peaks of the slope distribution may then be aligned along a single axis of an orthogonal coordinate system centered on O. As a variant, the slope distribution may have two peaks that are symmetric to each other with respect to one of the axes of an orthogonal coordinate system centered on O.

According to one feature, the slope distribution of the texture of each textured contact surface of the layered element, which corresponds to the frequency of each pair of slopes ($\theta_x$, $\theta_y$), has, excluding a potential peak centered on O, at least one peak not centered on O and for which the aspect ratio, which is a ratio between the width of the peak along the axis O$\theta_x$ and the width of the peak along the axis O$\theta_y$, is different from 1. The choice of an aspect-ratio value different from 1 makes it possible to obtain a larger angular range of observation in one of the two directions Ox or Oy, this possibly being useful for example when the layered element is integrated into an environment in which the ability to observe is limited in one of the directions.

Preferably, the layered element is such that, for a sample of N pixels, the average of the correlation coefficients r($f_{pix}$, $f_{tot}$) of each pixel of the sample is higher than or equal to 0.9.

Preferably, each pixel has at least one side of length smaller than or equal to 150 µm, and more preferably smaller than or equal to 100 µm.

The number N of pixels in each sample is preferably such that N≥3. The pixels of each sample are preferably chosen randomly. Advantageously, the sample of N pixels is chosen from N+2 pixels, the pixel having the highest correlation coefficient and the pixel having the lowest correlation coefficient being removed.

The parallelism of the textured contact surfaces of the transparent layered element implies that, for the or each layer of the central layer that is flanked by layers of, metallic or nonmetallic, nature different from its or their own or of refractive indices different from its or their own, the thickness of the layer is uniform perpendicular to its contact surfaces with the adjacent layers. This uniformity in thickness may be global over the entire extent of the texture, or local in segments of the texture. In particular, when the texture has variations in slope, the thickness between two consecutive textured contact surfaces may change, from segment to segment, depending on the slope of the texture, the textured contact surfaces however always remaining parallel to one another. This case in particular arises with a layer deposited by cathode sputtering, in particular by cathode sputtering assisted by a magnetic field (magnetron cathode sputtering), as then the thickness of the layer decreases as the slope of the texture increases. Thus, locally, in each segment of texture having a given slope, the thickness of the layer remains constant, but the thickness of the layer differs between a first segment of texture having a first slope and a second segment of texture having a second slope different from the first slope.

Advantageously, in order to obtain the parallelism of the textured contact surfaces in the interior of the transparent layered element, the or each constituent layer of the central layer is a layer deposited by cathode sputtering. Specifically, cathode sputtering, in particular cathode sputtering assisted by a magnetic field (magnetron cathode sputtering), guarantees that the surfaces bounding the layer are parallel to each other, this not being the case for other deposition techniques such as evaporation or chemical vapor deposition (CVD), or even the sol-gel process. The parallelism of the textured contact surfaces in the interior of the layered element is essential to the obtainment of specular transmission through the element.

According to one aspect of the invention, the central layer of the transparent layered element comprises at least one thin layer made of a dielectric material of high refractive index, different from the refractive index of the external layers, such as $Si_3N_4$, $SnO_2$, ZnO, AlN, NbO, NbN, $TiO_2$, or made of a dielectric material having a low refractive index, different from the refractive index of the external layers, such as $SiO_2$, $Al_2O_3$, $MgF_2$, $AlF_3$. The central layer may also comprise at least one thin metal layer, in particular a thin layer of silver, of gold, of titanium, of niobium, of silicon, of aluminum, of nickel-chromium (NiCr) alloy, of stainless steel, or of alloys thereof. In the context of the invention, a thin layer is a layer of thickness smaller than 1 micron.

Advantageously, the chemical composition of the central layer may be adjusted to give additional properties to the transparent layered element, for example thermal properties, such as solar-control and/or low-emissivity properties. Thus, in one embodiment, the central layer is a stack of thin layers comprising an alternation of "n" metal functional layers, in particular functional layers based on silver or on a metal alloy containing silver, and of "(n+1)" coatings for controlling the reflection of the functional layers, with n≥1, where each metal functional layer is placed between two coatings for controlling reflection.

As is known, such a stack containing one or more functional metal layers has reflective properties in the domain of solar radiation and/or in the domain of long-wavelength infrared. In such a stack, the one or more metal functional layers essentially determine the thermal performance level, whereas the coatings for controlling reflection that flank them change optical appearance interferentially. Specifically, although the metal functional layers allow a desired thermal performance level to be obtained even when their geometric thickness is small, about 10 nm for each metal functional layer, they however strongly oppose the passage of radiation in the visible wavelength domain. Thus, coatings for controlling reflection are necessary on either side of each metal functional layer if good transmission of light is to be achieved in the visible domain. In practice, it is the overall stack of the central layer, comprising the thin metal layers and the coatings for controlling reflection, that is optically optimized. Advantageously, the optical optimization may be performed on the overall stack of the layered element or of the glazing, i.e. the stack including the external layers positioned on either side of the central layer and any additional layers.

The transparent layered element obtained then combines optical properties, namely properties of specular transmission and of diffuse reflection of radiation incident on the layered element, and thermal properties, namely solar-control and/or low-emissivity properties. Such a transparent layered element may be used in solar protection and/or thermal insulation glazings, in particular for vehicles or buildings.

According to one aspect of the invention, the texture of each contact surface between two adjacent layers, one of which is a transparent, in particular dielectric, layer and the other of which is a metal layer, or that are two transparent, in particular dielectric, layers of different refractive indices, is formed by a plurality of features that are recessed or that protrude with respect to a general plane of the contact surface. In the context of the invention, the root mean square slope Rdq of the texture of each contact surface is strictly higher than 0.2°. Preferably, the root mean square slope Rdq of the texture of each contact surface is comprised between 0.5° and 30°, preferably between 2° and 20°, and more preferably between 2° and 10°. In the context of this patent application, the root mean square slope Rdq of a surface is such as defined in standard ISO 4287, and measured using a MICROMESURE 2 profilometer from STIL, in an area of 1 mm×1 mm with a sampling interval of 1 μm×1 μm.

For roughness measurements carried out using the MICROMESURE 2 profilometer from STIL, the measurement conditions are the following. The measurement head consists of a chromatic lens associated with a "magnifier" having the following characteristics: numerical aperture of 0.42; maximum measurement angle of 25°; resolution in Z of 0.04 microns; lateral resolution of 4.5 microns. The roughness parameter, i.e. the root mean square slope Rdq, is extracted with a low-pass Gaussian filter having a cut-off length of 19 microns (which filters micro-roughness) and a high-pass Gaussian filter having a cut-off length of 1 mm (which filters undulations).

In one embodiment of the invention, one of the two external layers of the transparent layered element is a textured external layer comprising a flexible or rigid substrate, in particular made of glass or made of polymeric organic material, a main surface of which is textured. One of the main surfaces of the substrate may be textured by any known texturing process, for example by embossing the surface of the substrate heated beforehand to a temperature at which it is possible to deform it, in particular by rolling by means of a roller having on its surface a complementary texture to the texture to be formed on the substrate, or even by 3D printing, preferably on the basis of a texture generated computationally.

In the case of a textured external layer formed by a textured substrate made of mineral glass, the glass is preferably soda-lime-silica glass, but, according to variants, it may be borosilicate glass, alumino-borosilicate glass, etc.

In the case of a textured external layer formed by a textured substrate made of polymeric organic material, examples of suitable materials comprise, in particular, polyesters such as polyethylene terephthalate (PET), polybutylene terephthalate (PBT) and polyethylene naphthalate (PEN); polyacrylates such as polym ethyl methacrylate (PMMA); polycarbonates; polyurethanes; polyam ides; polyimides; fluoropolymers such as ethylene tetrafluoroethylene (ETFE), polyvinylidene fluoride (PVDF), polychlorotrifluoroethylene (PCTFE), ethylene chlorotrifluoroethylene (ECTFE) and fluorinated ethylene-propylene copolymers (FEP); photocurable and/or photopolymerizable resins, such as thiol-ene, polyurethane, urethane-acrylate, polyester-acrylate resins; and polythiourethanes. These polymers in general have a refractive index range at 550 nm extending from 1.30 to 1.70. However, it is interesting to note that certain of these polymers, and in particular the sulfur-containing polymers such as the polythiourethanes, may have refractive indices at 550 nm that are high and possibly of as high as 1.74.

In another embodiment of the invention, one of the two external layers of the transparent layered element is a textured external layer formed by a formable layer, a main surface of which is textured and that is added, via its other main surface, to a flexible or rigid substrate. It may in particular be a question of a thermoformable layer or of a layer made of photocurable and/or photopolymerizable material. In this case, one process very suitable for texturing one of the main surfaces of the formable layer is, in particular, embossing. Preferably, the photocurable and/or photopolymerizable material is a liquid at room temperature and yields, when it has been irradiated and photocured and/or photopolymerized, a transparent solid devoid of bubbles or any other irregularity. It may in particular be a question of a resin such as those commonly used as adhesives, glues or surface coatings. These resins are generally based on monomers/comonomers/prepolymers of epoxy, epoxysilane, acrylate, methacrylate, acrylic-acid or methacrylic-acid type. Mention may be made, by way of example, of thiol-ene, polyurethane, urethane-acrylate and polyester-acrylate resins. Instead of a resin, it may be a question of a photocurable aqueous gel, such as a polyacrylamide gel.

When one of the two external layers of the transparent layered element is a textured external layer, one main surface of which is textured and the other main surface of which is smooth, the central layer is advantageously formed:
either by a single layer made of metallic material or made of transparent, in particular dielectric, material of refractive index different from that of the textured external layer, which layer is deposited conformally on the textured main surface of the textured external layer,
or by a stack of layers, which comprises at least one layer made of metallic material or made of transparent, in particular dielectric, material of refractive index different from that of the textured external layer, which layers are deposited in succession conformally on the textured main surface of the textured external layer.

According to the invention, the deposition of the central layer, or the successive deposition of the layers of the central layer, on the textured main surface of the textured external layer is considered to be carried out conform ally if, following the deposition, the surface of the or each layer of the central layer is textured and parallel to the textured main surface of the textured external layer. According to one advantageous feature, the conformal deposition of the central layer, or the successive conformal deposition of the layers of the central layer, on the textured main surface of the textured external layer, is achieved by cathode sputtering, in particular cathode sputtering assisted by a magnetic field (magnetron cathode sputtering). Other deposition techniques such as evaporation techniques are also envisionable, in particular for deposition of metal layers.

According to one aspect of the invention, the other external layer of the transparent layered element, i.e. the external layer located on the other side of the central layer with respect to the textured external layer, comprises a layer of settable material of refractive index substantially equal to that of the textured external layer, deposited on the textured main surface of the central layer opposite to the textured external layer while initially in a viscous, liquid or pasty state suitable for forming operations.

The deposited layer initially in a viscous, liquid or pasty state may in particular be a layer for planarizing the surface of the transparent layered element. As a variant, the deposited layer initially in a viscous, liquid or pasty state may be a layer that ensures bonding between, on the one hand, the textured external layer equipped with the central layer and, on the other hand, a counter-substrate.

The deposited layer initially in a viscous, liquid or pasty state may be a layer of photocurable and/or photopolymerizable material. Preferably, this photocurable and/or photopolymerizable material is a liquid at room temperature and yields, when it has been irradiated and photocured and/or photopolymerized, a transparent solid devoid of bubbles or any other irregularity. It may in particular be a question of a resin such as those commonly used as adhesives, glues or surface coatings. These resins are generally based on monomers/comonomers/prepolymers of epoxy, epoxysilane, acrylate, methacrylate, acrylic-acid or methacrylic-acid type. Mention may be made, by way of example, of thiol-ene, polyurethane, urethane-acrylate and polyester-acrylate resins. Instead of a resin, it may be a question of a photocurable aqueous gel, such as a polyacrylamide gel.

As a variant, the deposited layer initially in a viscous, liquid or pasty state may be a layer deposited by a sol-gel process, in particular a sol-gel layer comprising a hybrid organic/inorganic silica-based matrix. Such a sol-gel layer is particularly advantageous because it is possible to adjust with precision the value of its refractive index, so as to make it match as closely as possible that of the textured external layer. According to the invention, the index difference between the two external layers of the transparent layered element corresponds to the absolute value of the difference between the refractive indices at 550 nm of the dielectric materials from which they are made. The smaller the refractive index difference, the clearer vision through the layered element. In particular, excellent vision is obtained with an index difference smaller than or equal to 0.050, preferably smaller than or equal to 0.030 and better still smaller than or equal to 0.015.

According to one aspect of the invention, at least one of the two external layers of the transparent layered element is an interlayer sheet based on polymer material, in particular thermoformable or pressure-sensitive polymer material, i.e. the type of sheet that is used as interlayer in laminated glazings. It may be a question, in particular, of at least one sheet based on polyvinyl butyral (PVB), ethylene vinyl acetate (EVA), polyurethane (PU), polyethylene terephthalate (PET) or polyvinyl chloride (PVC). This layer based on polymer material may play the role of a lamination interlayer that may be laminated or calender-rolled onto a substrate by way of additional layer, for example a clear or extra-clear glass substrate.

According to one aspect of the invention, the transparent layered element may be a flexible film. Such a flexible film is advantageously equipped, on one of its external main surfaces, with an adhesive layer covered with a protective strip intended to be removed for the adhesive bonding of the film. The layered element in the form of a flexible film is then able to be added by adhesive bonding to an existing surface, for example a surface of a transparent glazing, in order to give this surface diffuse reflection properties, while maintaining the property of specular transmission through the glazing. The glazing to which the transparent layered element in the form of a flexible film is added may be a planar or curved glazing.

Another subject of the invention is a transparent glazing comprising a transparent layered element such as described above. The invention more particularly relates to a transparent projection screen comprising a transparent layered element such as described above.

In one embodiment, the transparent projection screen or glazing furthermore comprises at least one additional layer positioned against the transparent layered element, preferably chosen from:
transparent substrates chosen from polymers, glasses or ceramics comprising two smooth main surfaces,
setable materials initially in a viscous, liquid or pasty state suitable for forming operations, in particular a sol-gel layer,
polymer-based interlayer sheets, in particular thermoformable or pressure-sensitive interlayer sheets.

Advantageously, a transparent projection screen or glazing incorporating the layered element comprises at least one antireflection coating at the interface between the air and the material from which the layer forming an external main surface of the glazing is made, said surface being intended to be opposite a projector during the projection of images onto the glazing. The addition of an antireflection coating allows multiple reflections in the interior of the transparent layered element to be decreased and thus the quality of the projected images to be improved.

The antireflection coating provided on at least one of the external main surfaces of the transparent projection screen or glazing may be of any type allowing the reflection of radiation at the interface between the air and the layer forming the external main surface to be decreased. It may be a question, in particular, of a layer of refractive index comprised between the refractive index of air and the refractive index of the layer forming the external main surface, such as a layer deposited on the surface of the layer forming the external main surface by a vacuum technique or a porous layer of sol-gel type, or even, in the case where the layer forming the external main surface is made of glass, a superficial portion removed from this glass layer by an acid etching treatment. As a variant, the antireflection coating may be formed by a stack of thin layers having alternately lower and higher refractive indices, playing the role of an interference filter at the interface between the air and the layer forming the external main surface, or by a stack of thin layers having a, continuous or stepped, refractive-index gradient between the refractive index of air and that of the layer forming the external main surface.

The smooth external main surfaces of the transparent layered element and of the transparent projection screen or glazing may be planar or curved. In particular, the transparent layered element may be employed in a curved glazing, for example for buildings or vehicles, in particular motor vehicles. According to one aspect of the invention, the smooth external main surfaces of the transparent layered element may not be parallel to each other, for example in the case of a wedge-shaped layered element intended to be used in a device moreover comprising a head-up display (HUD), in order to avoid ghost images. In other applications, the smooth external main surfaces of the layered element are preferably parallel to each other, this contributing to limiting luminous dispersion of radiation passing through the layered element, and therefore to improving the clearness of vision through the layered element.

BRIEF DESCRIPTION OF THE FIGURES

Features and advantages of the invention will become apparent from the following description of a plurality of embodiments of a layered element and of a transparent projection screen or glazing according to the invention, which description is given merely by way of example with reference to the appended drawings, in which:

FIG. 1 is a schematic view showing diffuse and specular reflection of radiation incident on a layered element according to the prior art.

FIG. 2 is a schematic cross section of a layered element according to the invention, the position of a projector also being shown in this figure.

FIG. 5b schematically shows the slope distribution of the textured contact surface of FIG. 5a.

FIG. 6b schematically shows the slope distribution of the textured contact surface of FIG. 6a.

FIG. 7b schematically shows the slope distribution of the textured contact surface of FIG. 7a.

DETAILED DESCRIPTION

Unless specified otherwise, a given element appearing in various figures has been referenced with a single reference. For the sake of clarity of the drawings, the relative thicknesses of the various layers have not been rigorously respected in FIGS. 2 to 4. In addition, the possible variation in the thickness of the or each constituent layer of the central layer as a function of the slope of the texture has not been shown in these figures, it being understood that this possible variation in thickness does not affect the parallelism of the textured contact surfaces. Specifically, for each given slope of the texture, the textured contact surfaces are parallel to one another. Moreover, it will be noted that the contact surfaces are shown only schematically in FIGS. 2 to 4, it being understood that their texture respects the slope-distribution criterion of the invention.

FIG. 1, which schematically shows diffuse and specular reflection of radiation incident on a layered element according to the prior art, was described above.

Figure 2A:
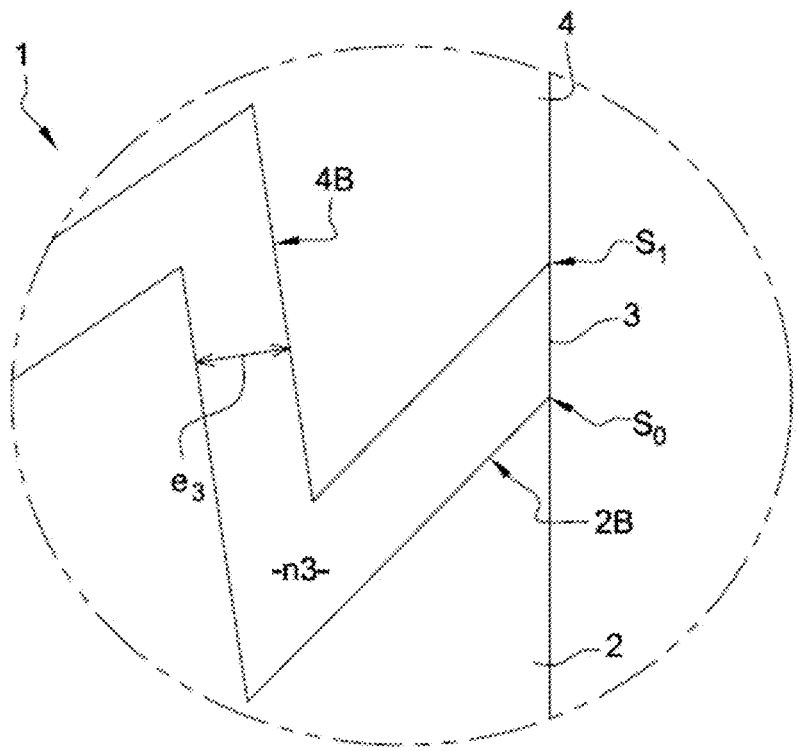
FIG. 2a is a larger-scale view of a detail of the layered element of FIG. 2, according to a first alternative.
Figure 2B:
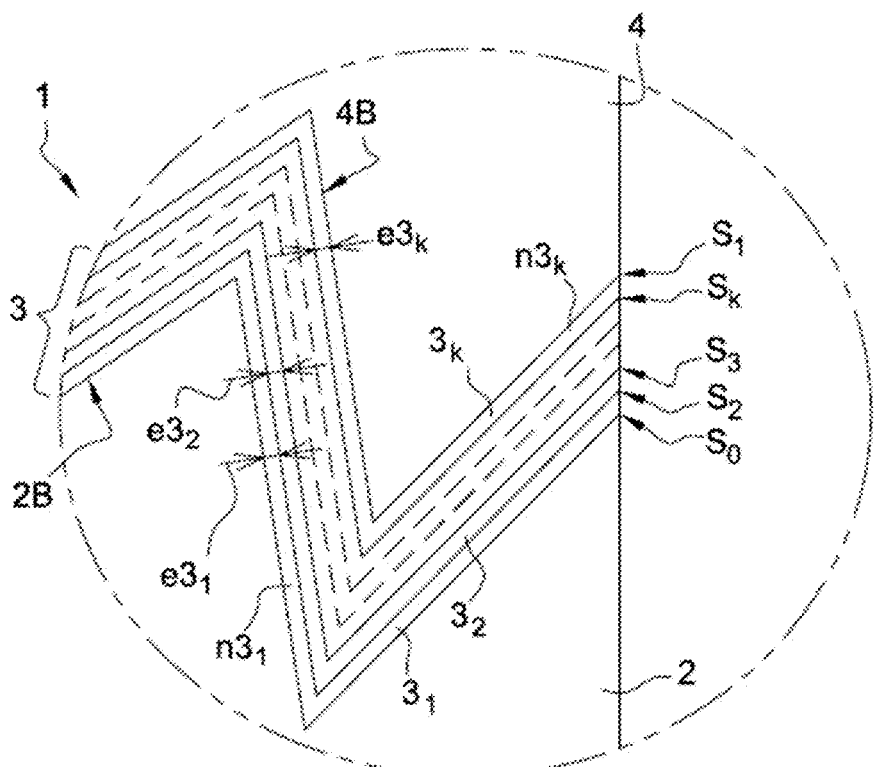
FIG. 2b is a larger-scale view of a detail of the layered element of FIG. 2, according to a second alternative.

FIGS. 2a and 2b show a layered element 1 according to the invention, including two external layers 2 and 4 that are made of transparent dielectric materials having substantially the same refractive index n2, n4. Each external layer 2 or 4 has a smooth main surface, 2A and 4A, respectively, directed toward the exterior of the layered element, and a textured main surface, 2B and 4B, respectively, directed toward the interior of the layered element.

The textures of the internal surfaces 2B and 4B are complementary to each other. The textured surfaces 2B and 4B are positioned facing each other, in a configuration in which their textures are strictly parallel to each other. The layered element 1 also comprises a central layer 3, intermediate between and in contact with the textured surfaces 2B and 4B.

FIG. 2a shows a variant embodiment in which the central layer 3 is a monolayer made of a transparent material that is either metallic, or dielectric of refractive index n3 different from that of the external layers 2 and 4. FIG. 2b shows a variant embodiment in which the central layer 3 is formed by a transparent stack of a plurality of layers $3_1, 3_2, \ldots, 3_k$, in which at least one of the layers $3_1$ to $3_k$ is either a metal layer, or a dielectric layer of refractive index different from that of the external layers 2 and 4. Preferably, at least each of the two layers $3_1$ and $3_k$ located at the ends of the stack is a metal layer or a dielectric layer of refractive index $n3_1$ or $n3_k$ different from that of the external layers 2 and 4.

In FIGS. 2*a* and 2*b*, the contact surface between the external layer 2 and the central layer 3 has been denoted $S_0$, and the contact surface between the central layer 3 and the external layer 4 has been denoted $S_1$. In addition, in FIG. 2*b*, the internal contact surfaces of the central layer 3 have been successively denoted $S_2$ to $S_k$ starting from the contact surface closest to the surface $S_0$.

In the variant of FIG. 2*a*, because of the arrangement of the central layer 3 in contact between the textured surfaces 2B and 4B that are parallel to each other, the contact surface $S_0$ between the external layer 2 and the central layer 3 is textured and parallel to the contact surface $S_1$ between the central layer 3 and the external layer 4. In other words, the central layer 3 is a textured layer having a uniform thickness e3, measured perpendicular to the contact surfaces $S_0$ and $S_1$.

In the variant of FIG. 2*b*, each contact surface $S_2, \ldots, S_k$ between two adjacent layers of the constituent stack of the central layer 3 is textured and strictly parallel to the contact surfaces $S_0$ and $S_1$ between the external layers 2, 4 and the central layer 3. Thus, all the contact surfaces $S_0, S_1, \ldots, S_k$ between adjacent layers of the layered element 1 that are either of different, dielectric or metallic, natures or made of dielectric materials of different refractive indices, are textured and parallel to one another. In particular, each layer $3_1, 3_2, \ldots, 3_k$ of the constituent stack of the central layer 3 has a uniform thickness $e3_1, e3_2, \ldots, e3_k$, measured perpendicular to the contact surfaces $S_0, S_1, \ldots, S_k$.

According to one aspect of the invention, the thickness e3 or $e3_1, e3_2, \ldots, e3_k$ of the or each constituent layer of the central layer 3 is smaller than the average height of the features of each textured contact surface $S_0, S_1$ or $S_0, S_1, \ldots, S_k$ of the layered element 1. This condition is important as it increases the probability that the entrance interface of radiation into a layer of the central layer 3 and the exit interface of the radiation from this layer will be parallel, and thus increases the percentage of radiation specularly transmitted through the layered element 1. In order make the various layers easier to see, this condition has not been strictly respected in the figures. In practice, when the central layer 3 is a thin layer or a stack of thin layers, the thickness e3 or $e3_1, e3_2, \ldots, e3_k$ of each layer of the central layer 3 is about, or smaller than, 1/10 of the average height of the features of each textured contact surface of the layered element.

Figure 3:
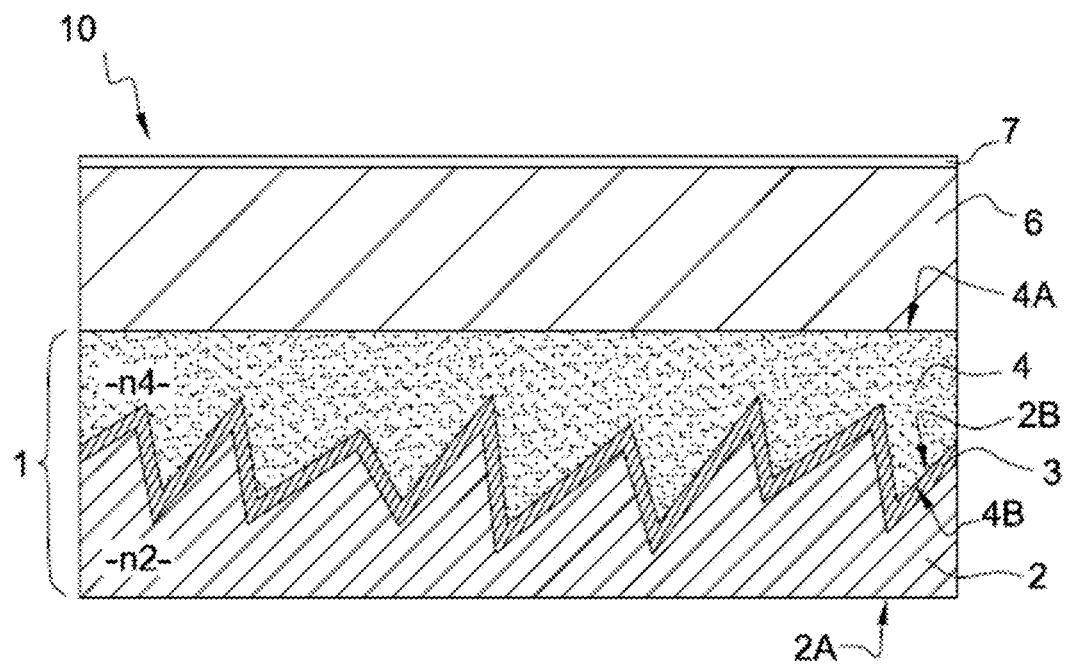
FIG. 3 is a schematic cross section of a projection system, comprising a projector and a glazing including the layered element of FIG. 2, for a first structural variant of the glazing.
Figure 4:
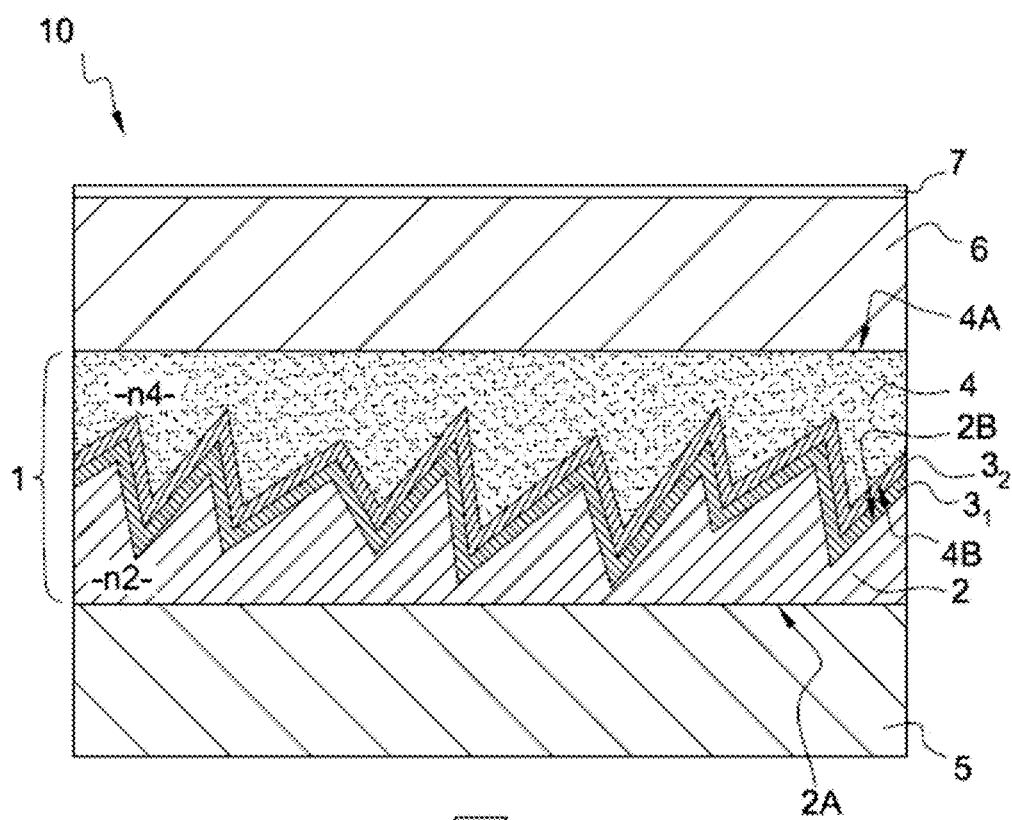
FIG. 4 is a cross section analogous to FIG. 3 of a projection system, comprising a projector and a glazing including the layered element of FIG. 2, for a second structural variant of the glazing.

Each of FIGS. 3 and 4 is a schematic cross section of a projection system comprising a projector P and a glazing 10 including the layered element 1 of FIG. 2. FIGS. 3 and 4 illustrate two possible structures for the glazing 10, by way of nonlimiting example.

In the first example glazing 10 shown in FIG. 3, the first external layer 2 is a textured substrate made of clear or extra-clear glass, and the second external layer 4 is formed by an interlayer sheet (for example made of PVB) that has substantially the same refractive index as the substrate 2 and that conforms to the texture of the textured surface of the central layer 3. The interlayer sheet 4 is calender-rolled via its external surface 4A onto a planar substrate 6 made of clear or extra-clear glass, for example made of the glass SGG Planilux sold by Saint-Gobain Glass, which forms an additional layer. In addition, the glazing 1 comprises an antireflection coating 7 on the external main surface of the planar substrate 6, which is intended to be opposite with respect to a projector P during the projection of images onto the glazing 10. The presence of the antireflection coating 7 allows multiple reflections in the interior of the layered element 1 to be decreased and thus the quality of the projected images to be improved.

In the second example glazing 10 shown in FIG. 4, the first external layer 2 is not a textured glass substrate but an interlayer sheet (for example made of PVB) that has substantially the same refractive index as the interlayer sheet 4. In this second example, the central layer 3 comprises a flexible film $3_1$, for example a film of polymethyl methacrylate (PMMA) having a thickness of about 50 to 250 μm, on which has been deposited a thin layer $3_2$ made of dielectric material or made of metal material, for example a thin layer of $TiO_2$ having a thickness of about 50 to 75 nm. The assembly consisting of the flexible film $3_1$ and of the thin layer $3_2$ is given a corrugated or accordion shape in order to create the textured central layer 3, which is then sandwiched between the interlayer sheets 2 and 4, such that the contact surfaces between the layers 2, $3_1$, $3_2$ and 4 remain parallel to one another. Each of the interlayer sheets 2, 4 is calender-rolled via its external surface 2A, 4A onto a planar substrate 5 or 6 made of clear or extra-clear glass, for example made of the glass SGG Planilux sold by Saint-Gobain Glass, which substrates form additional layers. In addition, as in the example of FIG. 3, the glazing 1 comprises an antireflection coating 7 on the external main surface of the planar substrate 6, which is intended to be opposite with respect to a projector P during the projection of images onto the glazing 10.

The layered element 1 or a glazing incorporating it is able to be used as a projection screen. Such as shown in FIG. 2, the first and second external layers 2, 4 and the central layer 3 of the layered element 1 lie parallel to a plane Oxy of a coordinate system (O, x, y, z), where the axis Ox is in a horizontal direction and the axis Oy is in a vertical direction with respect to an observer. In the example of FIG. 2, the observer is located on the side of the projector P, facing this smooth main surface 2A of the layered element 1.

The texture of each textured contact surface $S_0, S_1, S_k$ of the layered element 1 is of equation $z=f(x, y)$ and has, at each point of coordinates $(X_0, Y_0)$ of the contact surface, a first directional slope $\theta_x$ and a second directional slope $\theta_y$ such that:

$$\theta_x(X_0, Y_0) = \arctan\frac{dz}{dx}\bigg|_{X_0,Y_0} \text{ and}$$

$$\theta_y(X_0, Y_0) = \arctan\frac{dz}{dy}\bigg|_{X_0,Y_0}.$$

According to the invention, the slope distribution of the texture of each textured contact surface $S_0, S_1, \ldots, S_k$, which corresponds to the frequency of each pair of slopes $(\theta_x, \theta_y)$, does not have axial symmetry about at least one of the axes $O\theta_x, O\theta_y$ of a first orthogonal coordinate system (O, $\theta_x, \theta_y$) where O corresponds to the pair of slopes (0, 0), or does not have axial symmetry about at least one of the axes $O\theta_x', O\theta_y'$ of a second orthogonal coordinate system (O, $\theta_x', \theta_y'$) obtained by rotating by 45° the first orthogonal coordinate system (O, $\theta_x, \theta_y$). A plurality of examples of slope distributions of textures according to embodiments of the invention are described below.

The texture according to the invention of each textured contact surface $S_0, S_1, \ldots, S_k$ is advantageously obtained by texturing a main surface of a first external layer among the two external layers 2 and 4, in particular by embossing or 3D printing, preferably on the basis of a computationally generated texture, and depositing the central layer 3 conformally on the textured main surface of the first external layer. The central layer 3 is considered to be deposited conformally on the textured main surface of the first external layer if, following the deposition, the top surface of the central layer 3 is textured and parallel to the textured main surface of the first external layer. The conformal deposition of the central layer 3, or the conformal deposition of the constituent layers of the stack of the central layer 3, on the textured main surface of the first external layer is preferably achieved by cathode sputtering, in particular cathode sputtering assisted by a magnetic field.

The second external layer among the two external layers 2 and 4 may be formed by depositing, on the textured main surface of the central layer 3 opposite the first external layer, a layer that has substantially the same refractive index as the first external layer and that is initially in a viscous state suitable for forming operations. The second external layer may thus be formed, for example, by a process comprising depositing a layer of photocurable and/or photopolymerizable material initially in fluid form then irradiating this layer, or by a sol-gel process. As a variant, the second external layer may be formed by positioning, against the textured main surface of the central layer 3 opposite the first external layer, a layer based on polymer material having substantially the same refractive index as the first external layer, then forming this layer based on polymer material against the textured main surface of the central layer 3 by compression and/or heating at least to the glass transition temperature of the polymer material.

Figure 5A:
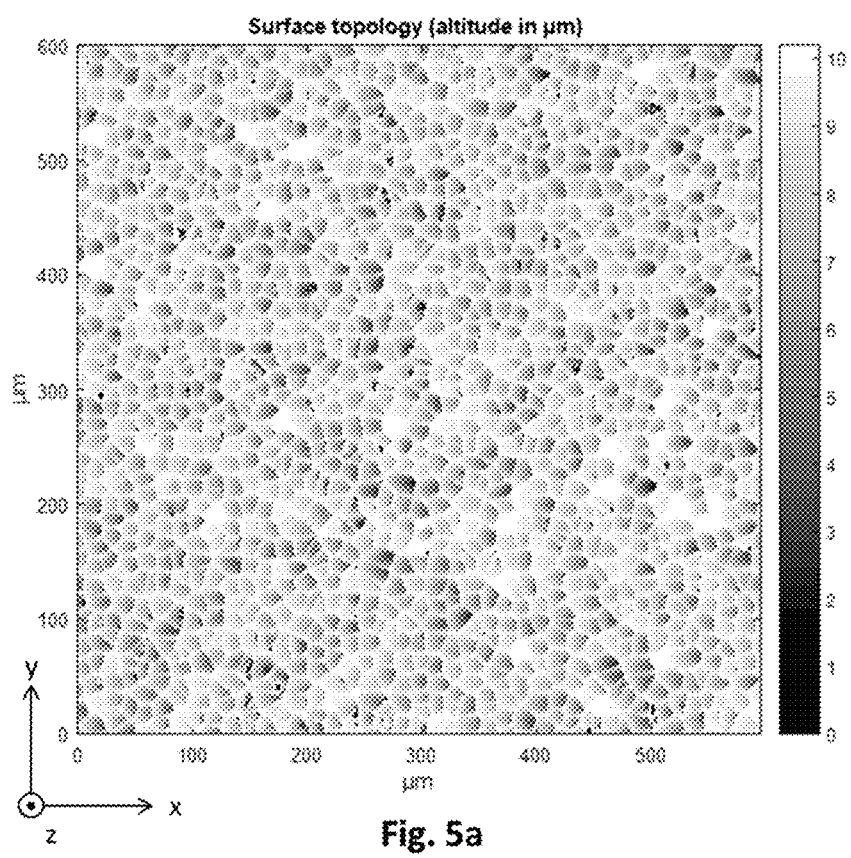
FIG. 5a is a topology of a textured contact surface of a layered element according to a first embodiment of the invention.
Figure 5B:
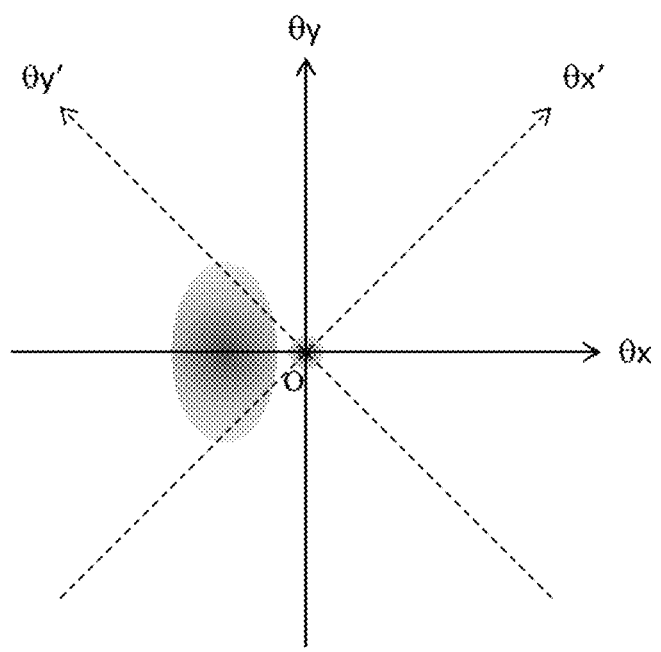

FIG. 5a shows a topology of a textured contact surface of a layered element 1 according to a first embodiment of the invention. FIG. 5b schematically shows the distribution of the slopes of the texture of the textured contact surface of FIG. 5a. In this first embodiment, the distribution of the slopes has an axial symmetry about the axis $O\theta_x$, but does not have axial symmetry about the axes $O\theta_y$, $O\theta_x'$ and $O\theta_y'$.

Figure 6A:
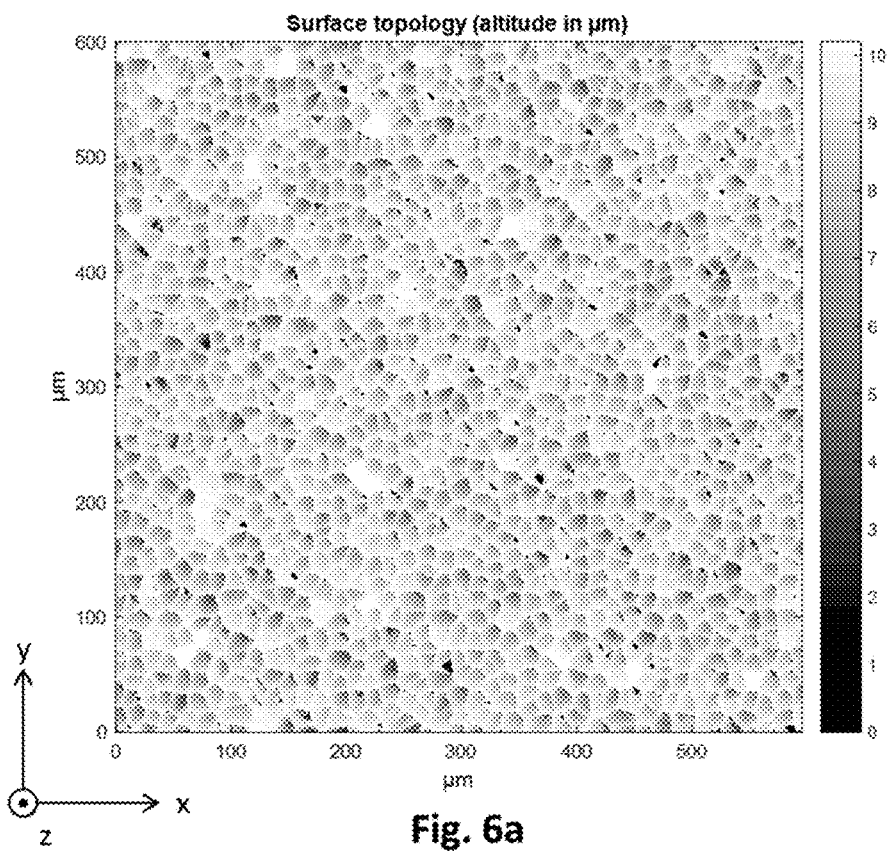
FIG. 6a is a topology of a textured contact surface of a layered element according to a second embodiment of the invention.
Figure 6B:
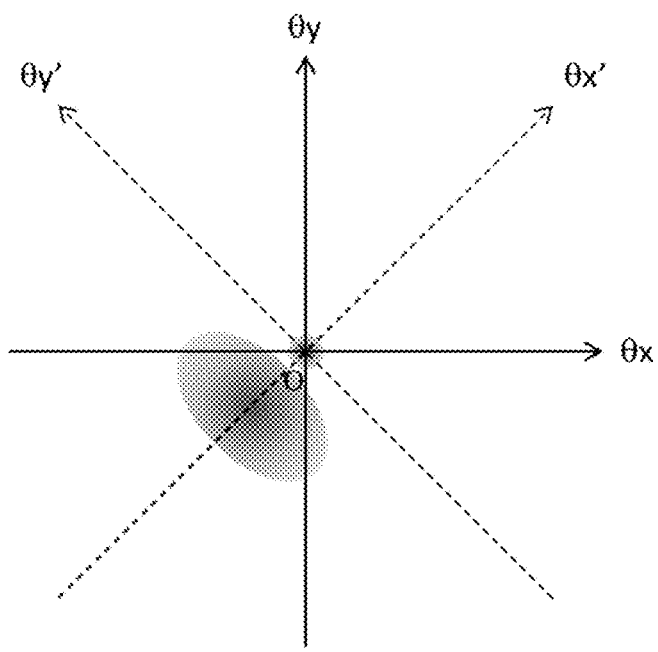

FIG. 6a shows a topology of a textured contact surface of a layered element 1 according to a second embodiment of the invention. FIG. 6b schematically shows the distribution of the slopes of the texture of the textured contact surface of FIG. 6a. In this second embodiment, the distribution of the slopes has an axial symmetry about the axis $O\theta_x'$, but does not have axial symmetry about the axes $O\theta_x$, $O\theta_y$ and $O\theta_y'$.

Figure 7A:
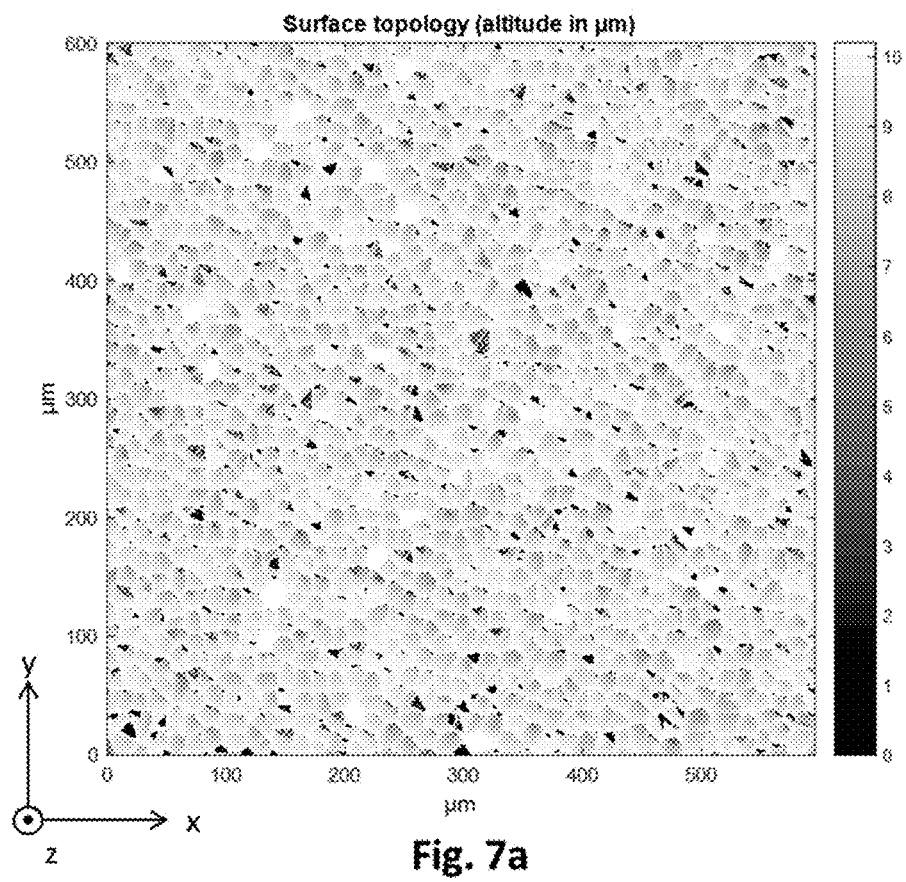
FIG. 7a is a topology of a textured contact surface of a layered element according to a third embodiment of the invention.
Figure 7B:
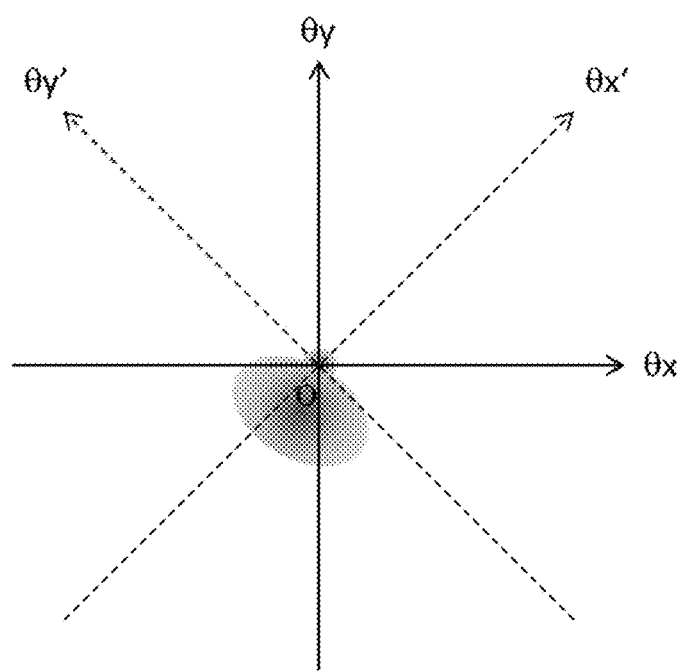

FIG. 7a shows a topology of a textured contact surface of a layered element 1 according to a third embodiment of the invention. FIG. 7b schematically shows the distribution of the slopes of the texture of the textured contact surface of FIG. 7a. In this third embodiment, the distribution of the slopes does not have axial symmetry about any one of the axes $O\theta_x$, $O\theta_y$, $O\theta_x'$ and $O\theta_y'$.

As may clearly be seen in FIGS. 5b, 6b and 7b, in the first, second and third embodiments, the slope distribution of the texture of each of the textured contact surfaces of the layered element 1, which corresponds to the frequency of each pair of slopes $(\theta_x, \theta_y)$, has a single peak not centered on O. This peak not centered on O corresponds to a privileged direction of specular reflection of radiation incident on the layered element 1, which is different from the direction of specular reflection. Thus, there is a privileged angle of observation for observing an image projected onto the layered element 1, or onto a glazing 10 incorporating it, this privileged angle of observation being different from the angle of specular reflection. Thus, an observer positioned with the privileged angle of observation may observe the projected image with a high brightness, and without being dazzled or discomforted by specular reflection from the smooth external surface of the layered element 1 or of a glazing 10.

Figure 8:
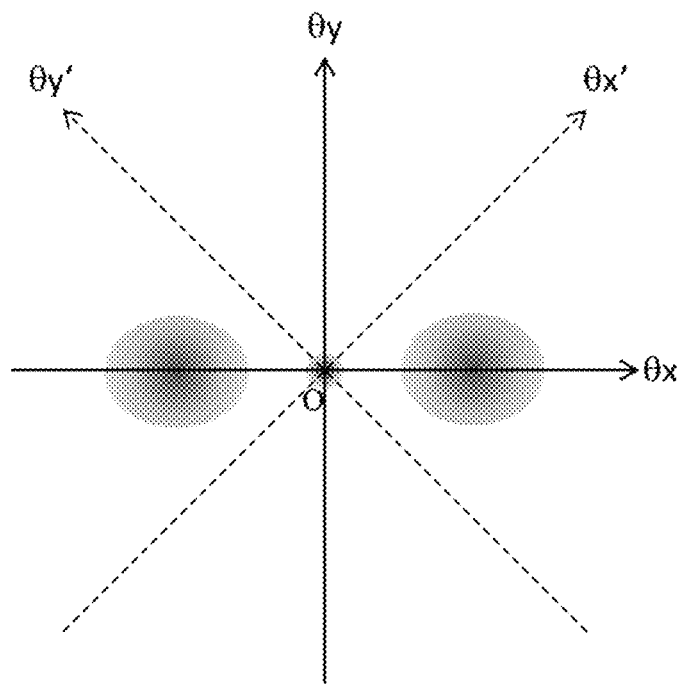
FIG. 8 schematically shows the slope distribution of a textured contact surface of a layered element according to a fourth embodiment of the invention.

FIG. 8 schematically shows the slope distribution of the texture of a textured contact surface of a layered element according to a fourth embodiment of the invention. In this fourth embodiment, the slope distribution has an axial symmetry about the axes $O\theta_x$ and $O\theta_y$, but does not have axial symmetry about the axes $O\theta_x'$ and $O\theta_y'$. In addition, as shown by the oval shape of each peak in FIG. 8, the width of the peak is asymmetric and larger along the axis $O\theta_x$ than along the axis $O\theta_y$, this indicating an angular range of observation for an observer that is larger along the axis Ox than along the axis Oy. In practice, for each peak of the slope distribution, an aspect ratio is defined, the aspect ratio being the ratio of the largest width of the peak, among the width along the axis $O\theta_x$ and the width along the axis $O\theta_y$, to the smallest width of the peak, among the width along the axis $O\theta_x$ and the width along the axis $O\theta_y$. Advantageously, when it is desired to have a larger angular range of observation in one of the directions Ox or Oy, for example when the layered element forms a screen integrated into an environment in which the ability to observe the screen is limited in one of these two directions, it is possible to choose a value for the aspect ratio different from 1 for at least one peak. Advantageously, the aspect ratio is comprised between 1 and 20.

Figure 9:
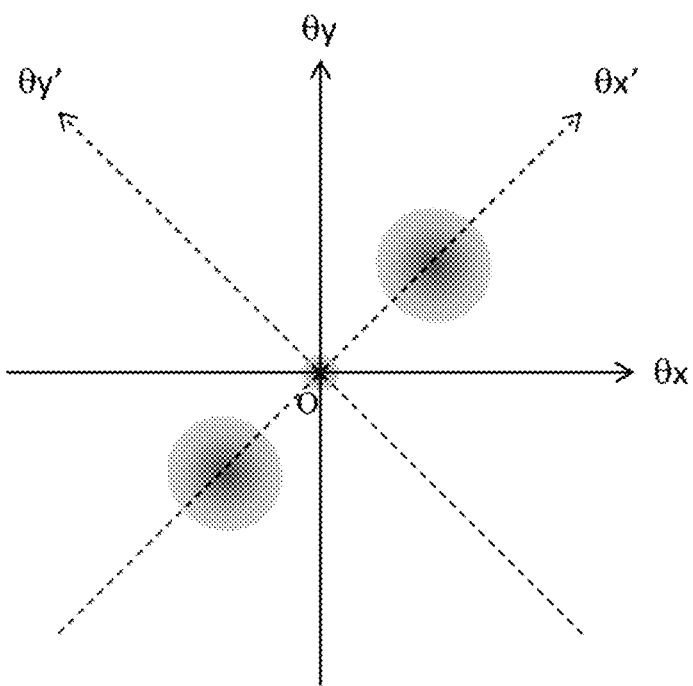
FIG. 9 schematically shows the slope distribution of a textured contact surface of a layered element according to a fifth embodiment of the invention.

FIG. 9 schematically shows the slope distribution of the texture of a textured contact surface of a layered element according to a fifth embodiment of the invention. In this fifth embodiment, the slope distribution has an axial symmetry about the axes $O\theta_x'$ and $O\theta_y'$, but does not have axial symmetry about the axes $O\theta_x$ and $O\theta_y$.

Figure 10:
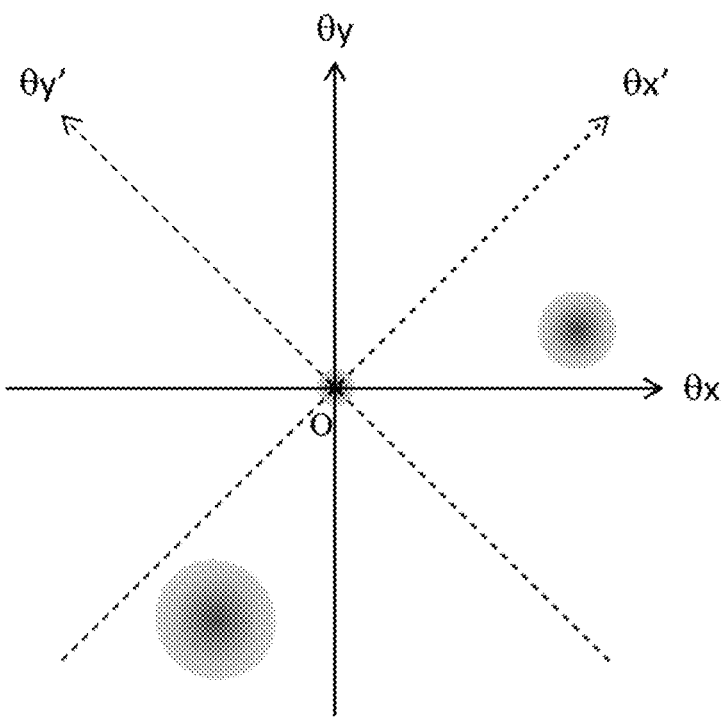
FIG. 10 schematically shows the slope distribution of a textured contact surface of a layered element according to a sixth embodiment of the invention.

FIG. 10 schematically shows the slope distribution of the texture of a textured contact surface of a layered element according to a sixth embodiment of the invention. In this sixth embodiment, the slope distribution does not have axial symmetry about any one of the axes $O\theta_x$, $O\theta_x'$, $O\theta_y$ and $O\theta_y'$.

Figure 11:
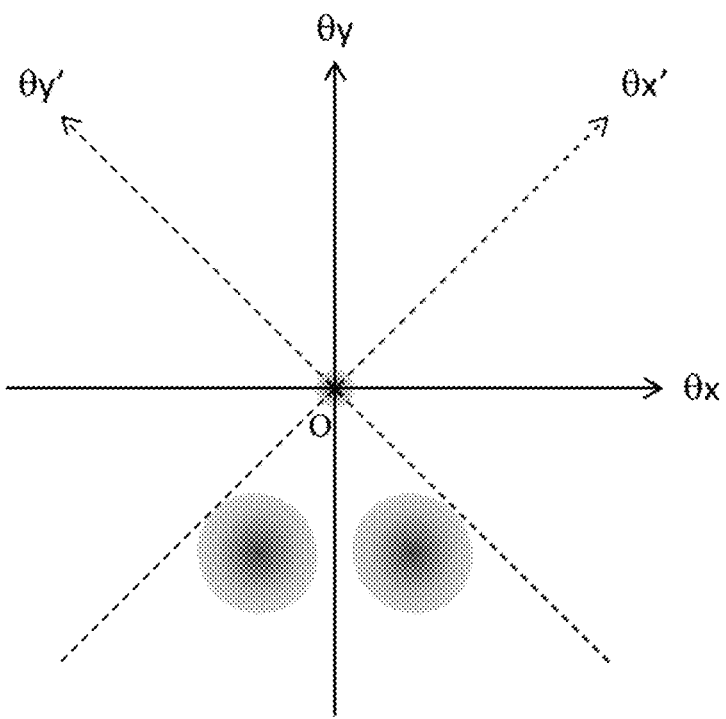
FIG. 11 schematically shows the slope distribution of a textured contact surface of a layered element according to a seventh embodiment of the invention.

FIG. 11 schematically shows the slope distribution of the texture of a textured contact surface of a layered element according to a seventh embodiment of the invention. In this seventh embodiment, the slope distribution has an axial symmetry about the axes $O\theta_y$, but does not have axial symmetry about the axes $O\theta_x$, $O\theta_x'$ and $O\theta_y'$.

As may clearly be seen in FIGS. 8 to 11, in the fourth, fifth, sixth and seventh embodiments, the slope distribution of the texture of each of the textured contact surfaces of the layered element 1, which corresponds to the frequency of each pair of slopes $(\theta_x, \theta_y)$, has two peaks not centered on O. These two peaks not centered on O correspond to two privileged directions of specular reflection of radiation incident on the layered element 1, which are different from each other and different from the direction of specular reflection. Thus, there are two privileged angles of observation for observing an image projected onto the layered element 1, or onto a glazing 10 incorporating it, each of these two privileged angles of observation being different from the angle of specular reflection. Thus, for an observer positioned with either of these two privileged angles of observation, the projected image is seen with a high brightness, and without any risk of being dazzled by specular reflection from the smooth external surface of the layered element 1 or of the glazing 10.

Other embodiments (not illustrated in the figures) are also envisionable for a layered element according to the invention, in particular embodiments in which the slope distribution of the texture of each of the textured contact surfaces of the layered element, which corresponds to the frequency of each pair of slopes ($\theta_x$, $\theta_y$), has a number n of peaks not centered on O, with n≥3, this corresponding to n privileged directions of specular reflection of radiation incident on the layered element, each one being different from the others and different from the direction of specular reflection. There are then n privileged angles of observation for observing an image projected onto the layered element or a glazing incorporating it. The number of peaks not centered on O has an impact on the brightness of each peak, which decreases as the number of peaks increases. A compromise between the number of angles of observation desired for the screen-forming layered element and the brightness at each angle of observation is therefore to be found, also depending on the luminous power of the employed projector.

It will be noted that in practice, the slope distribution of the texture of each textured contact surface of the layered element according to any one of the embodiments described above also has a peak centered on O, corresponding to the pair of slopes (0, 0), as schematically shown in FIGS. 5b, 6b, 7b and 8 to 11. Specifically, the actual textured features obtained, for example, by embossing glass or polymeric material on the basis of a computationally generated "perfect" texture, generally have ridges and extrema that are not perfectly sharp but slightly rounded.

Figure 12:
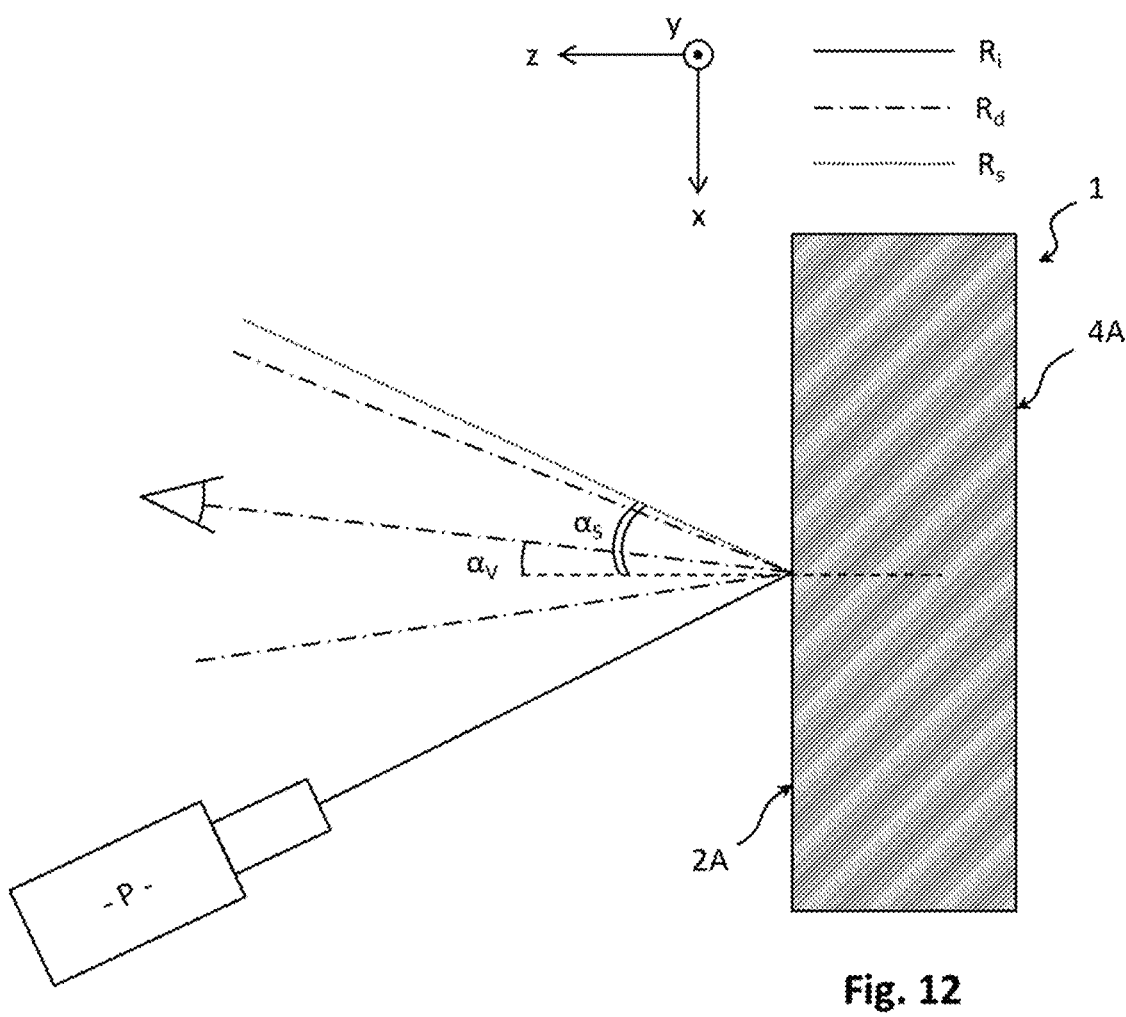
FIG. 12 is a schematic view showing diffuse and specular reflection of radiation incident on a layered element according to the invention.

FIG. 12 schematically shows the diffuse and specular reflection of radiation $R_i$ incident on a layered element 1 according to the invention. A first portion of the incident radiation is transmitted by the smooth external surface 2A and is then reflected diffusely, in a plurality of directions $R_d$, by the central layer 3 (not shown in FIG. 12). A second portion of the incident radiation is reflected by the smooth external surface 2A specularly, in the manner of a mirror, in a direction $R_s$. As the plurality of directions $R_d$ is not centered on the direction $R_s$ of specular reflection, the angle $\alpha_v$ of observation of an observer ideally placed relative to the plurality of directions $R_d$ of diffuse reflection to observe a projected image is different from the angle $\alpha_s$ of specular reflection. An observer thus positioned is therefore not dazzled or discomforted by undesirable specular reflection from the smooth external surface 2A.

Consider now that the smooth external surface 2A of the layered element 1 is divided into a plurality of pixels of given size, and that each pixel is projected orthogonally onto each textured contact surface plumb with said pixel. The texture of each contact surface is thus defined for said pixel. A pixel is typically of rectangular shape. The texture of each contact surface within each pixel has a slope distribution $f_{pix}(\theta_x, \theta_y)$ having a certain correlation coefficient r with the slope distribution $f_{tot}(\theta_x, \theta_y)$ of the texture of the total contact surface. The correlation coefficient r is defined by the following relationship:

$$r = \frac{\int_{\theta_x}\int_{\theta_y}[f_{pix}(\theta_x, \theta_y) - \overline{f_{pix}}][f_{tot}(\theta_x, \theta_y) - \overline{f_{tot}}]}{\sqrt{\left(\int_{\theta_x}\int_{\theta_y}[f_{pix}(\theta_x, \theta_y) - \overline{f_{pix}}]^2\right)\left(\int_{\theta_x}\int_{\theta_y}[f_{tot}(\theta_x, \theta_y) - \overline{f_{tot}}]^2\right)}}$$

where $\overline{f_{pix}}$ is the average of the function $f_{pix}$ over all of the slopes, and $\overline{f_{tot}}$ is the average of the function $f_{tot}$ over all of the slopes.

Advantageously, according to the invention, each pixel is a rectangle having at least one side of length smaller than or equal to 500 µm, and preferably smaller than or equal to 200 µm, and, for a sample of N pixels, the average of the correlation coefficients r of each pixel of the sample is higher than or equal to 0.8, and preferably higher than or equal to 0.9. Each pixel is thus sufficiently representative of the texture of the total contact surface, i.e. of the slope distribution of the texture of each of said textured contact surfaces of the layered element, to ensure a satisfactory resolution in particular when the layered element or a glazing incorporating it is used as projection screen. The need for a sufficient resolution is particularly great in the case of a layered element providing directional diffuse reflection, as if the resolution is not sufficient the surface of the layered element or of a glazing incorporating it will not uniformly redirect the radiation in the one or more privileged directions corresponding to the privileged angles of observation.

The number N of pixels in each sample is preferably such that N≥3. The pixels of each sample are preferably randomly chosen. In addition, preferably, the sample of N pixels is chosen from N+2 pixels, the pixel having the highest correlation coefficient and the pixel having the lowest correlation coefficient being removed.

The invention claimed is:

1. A transparent layered element comprising:
   two transparent external layers having substantially the same refractive index and each having a smooth external main surface, and
   a central layer intermediate between the external layers, the central layer including at least one transparent layer of refractive index different from that of the external layers or a metal layer,
   all the contact surfaces between two adjacent layers of the layered element, one of the two layers of which is a metal layer, or that are two transparent layers of different refractive indices, being textured and parallel to one another,
   wherein, for radiation incident on one side of the layered element, the diffuse light reflection of the layered element has at least one maximum in a direction different from the direction of specular reflection,
   and wherein a surface of the layered element is divided into a plurality of pixels of same size, each pixel having at least one side of length smaller than or equal to 500 µm, the texture of each textured contact surface within each pixel having a slope distribution $f_{pix}$ having a correlation coefficient r with the slope distribution $f_{tot}$ of the texture of the total textured contact surface, the layered element being such that, for a sample of N pixels, the average of the correlation coefficients r of each pixel of the sample is higher than or equal to 0.8.

2. The transparent layered element as claimed in claim 1, wherein the layered element is intended to be used, by an observer, lying substantially parallel to a plane Oxy of a coordinate system (O, x, y, z) in which the axis Ox is in a horizontal direction and the axis Oy is in a vertical direction with respect to the observer,
   the texture of each of said textured contact surfaces between two adjacent layers of the layered element, one of the two layers of which is a metal layer, or that are two transparent layers of different refractive indices, being of equation z=f(x, y) and having, at each point of coordinates $(X_0, Y_0)$ of the contact surface, a first directional slope $\theta_x$ and a second directional slope $\theta_y$ such that:

$$\theta_x(X_0, Y_0) = \arctan\frac{dz}{dx}\bigg|_{X_0,Y_0} \text{ and}$$

$$\theta_y(X_0, Y_0) = \arctan\frac{dz}{dy}\bigg|_{X_0,Y_0},$$

the slope distribution of the texture of each of said textured contact surfaces, which corresponds to the frequency of each pair of slopes $(\theta_x, \theta_y)$, not having axial symmetry about at least one of the axes ($O\theta_x$, $O\theta_y$) of a first orthogonal coordinate system $(O, \theta_x, \theta_y)$ where O corresponds to the pair of slopes $(0, 0)$, or not having axial symmetry about at least one of the axes ($O\theta_x'$, $O\theta_y'$) of a second orthogonal coordinate system $(O, \theta_x', \theta_y')$ obtained by rotating by 45° the first orthogonal coordinate system $(O, \theta_x, \theta_y)$.

3. The transparent layered element as claimed in claim 2, wherein the slope distribution of the texture of each of said textured contact surfaces, which corresponds to the frequency of each pair of slopes $(\theta_x, \theta_y)$, does not have axial symmetry about at least one of the axes of an orthogonal coordinate system centered on O.

4. The transparent layered element as claimed in claim 2, wherein the slope distribution of the texture of each of said textured contact surfaces, which corresponds to the frequency of each pair of slopes $(\theta_x, \theta_y)$, has, excluding a potential peak centered on O, a single peak not centered on O.

5. The transparent layered element as claimed in claim 2, wherein the slope distribution of the texture of each of said textured contact surfaces, which corresponds to the frequency of each pair of slopes $(\theta_x, \theta_y)$, has, excluding a potential peak centered on O, at least two peaks not centered on O.

6. The transparent layered element as claimed in claim 5, wherein all the peaks of the slope distribution of the texture of each of said textured contact surfaces are aligned along a single axis of an orthogonal coordinate system centered on O.

7. The transparent layered element as claimed in claim 5, wherein the slope distribution of the texture of each of said textured contact surfaces, which corresponds to the frequency of each pair of slopes $(\theta_x, \theta_y)$, has two peaks that are symmetric to each other with respect to one of the axes of an orthogonal coordinate system centered on O.

8. The transparent layered element as claimed in claim 2, wherein the slope distribution of the texture of each of said textured contact surfaces, which corresponds to the frequency of each pair of slopes $(\theta_x, \theta_y)$, has, excluding a potential peak centered on O, at least one peak not centered on O and for which the aspect ratio, which is a ratio between the width of the peak along the axis $O\theta_x$ and the width of the peak along the axis $O\theta_y$, is different from 1.

9. The transparent layered element as claimed in claim 1, wherein an average of the correlation coefficients r $(f_{pix}, f_{tot})$ of each pixel of the sample is higher than or equal to 0.9.

10. The transparent layered element as claimed in claim 1, wherein each pixel has at least one side of length smaller than or equal to 150 µm.

11. The transparent layered element as claimed in claim 10, wherein the length is smaller than or equal to 100 µm.

12. The transparent layered element as claimed in claim 1, wherein the sample of N pixels is chosen from N+2 pixels, the pixel having the highest correlation coefficient and the pixel having the lowest correlation coefficient being removed.

13. The transparent layered element as claimed in claim 1, wherein the layered element is a flexible film.

14. A transparent glazing, comprising a layered element as claimed in claim 1.

15. The transparent glazing as claimed in claim 14, further comprising at least one additional layer positioned against the layered element, chosen from:
- transparent substrates chosen from polymers, glasses or ceramics comprising two smooth main surfaces,
- setable materials initially in a viscous, liquid or pasty state suitable for forming operations,
- polymer-based interlayer sheets.

16. The transparent glazing as claimed in claim 15, wherein the least one additional layer is a sol-gel layer, or a thermoformable or pressure-sensitive interlayer sheet.

17. The transparent glazing as claimed in claim 14, further comprising at least one antireflection coating at the interface between the air and the material from which the layer forming an external main surface of the glazing is made, said surface being intended to be opposite with respect to a projector during the projection of images onto the glazing.

18. The transparent glazing as claimed in claim 14, wherein the transparent glazing is a transparent projection screen.

19. The transparent layered element as claimed in claim 1, wherein the length is smaller than or equal to 200 µm.

* * * * *